United States Patent [19]

Carpenter et al.

[11] Patent Number: 5,661,785
[45] Date of Patent: Aug. 26, 1997

[54] FLEXIBLE TELECOMMUNICATIONS LINE INTERFACE

[75] Inventors: Stuart Alan Carpenter, Aurora; Richard Gregory Carr, St. Charles; Stuart Mandel Garland, Morton Grove, all of Ill.

[73] Assignee: Lucent Technologies Inc., Murray Hill, N.J.

[21] Appl. No.: 632,522

[22] Filed: Apr. 12, 1996

Related U.S. Application Data

[63] Continuation of Ser. No. 362,636, Dec. 22, 1994, abandoned.

[51] Int. Cl.$^6$ .................................................. H04M 11/00
[52] U.S. Cl. ............................... 379/93.15; 379/93.01
[58] Field of Search ................................. 379/93, 94, 96, 379/97, 98, 100, 280

[56] References Cited

U.S. PATENT DOCUMENTS

| | | | |
|---|---|---|---|
| 3,760,364 | 9/1973 | Yamauchi et al. | 379/280 |
| 4,535,199 | 8/1985 | Zink | 379/94 |
| 4,922,348 | 5/1990 | Gillon et al. | 358/407 |
| 5,406,557 | 4/1995 | Baudoin | 379/94 |
| 5,526,037 | 6/1996 | Cortjens et al. | 375/220 |

OTHER PUBLICATIONS

U.S. application No. 07/937,814, Balgeman et al., filed Feb. 16, 1995.

*Primary Examiner*—Stella Woo
*Attorney, Agent, or Firm*—Werner Ulrich

[57] ABSTRACT

This invention relates to the use of a standard language and signal interface between a custom line card for connection to a corresponding arbitrary type terminal, and a switch. The line card is plugged into an interface unit which converts between the signals from the arbitrary type terminal and a standard set of signals for interfacing with the switch. The Bellcore TR303 standard is the preferred choice for communicating signals between the interface unit and the switch. The term terminal as used herein is very general and includes both simple (analog) and complex (video) telephone devices, as well as other types of customer premises equipment such as FAX terminals; it includes, for example a TV set-top box. Advantageously, only a small signal conversion program and table, and an interface card, need be developed in order to support a new type of terminal.

7 Claims, 3 Drawing Sheets

|  | 1000 (8) | 0100 (4) | 1100 C |
|---|---|---|---|
| 0001 (1) |  | CALL FORWARD ON |  |
| 0010 (2) |  | CALL FORWARD OFF | LAMP ON |
| 0011 (3) |  |  | LAMP OFF |
|  |  |  |  |
|  |  |  |  |
|  |  |  |  |
|  | TERMINAL CODE | | |

|  | 1000 (8) | 0100 (4) | 1100 C |
|---|---|---|---|
| 0001 (1) | CALL FORWARD ON |  | LAMP ON |
| 0010 (2) | CALL FORWARD OFF |  | LAMP OFF |
| 0011 (3) |  |  |  |
|  |  |  |  |
|  |  |  |  |
|  |  |  |  |
|  | STANDARD CODE | | |

5,661,785

FLEXIBLE TELECOMMUNICATIONS LINE INTERFACE

This application is a continuation of application Ser. No. 08/362,636, filed on Dec. 22, 1994, abandoned.

TECHNICAL FIELD

This invention relates to interfaces between telecommunications lines and a telecommunications switching system.

PROBLEM

Modern telecommunication systems are increasingly called upon to serve new types of terminals including highly flexible telecommunications terminals such as integrated services digital network (ISDN) telephones, data terminals, facsimile terminals, and even video terminals. The characteristics of these terminals vary widely and each different type of terminal requires its own hardware and software interface in the telecommunications switch serving that type of telephone. As a result, these interfaces include complex software in the telecommunications switch. Further, because this complex software must be integrated with a large amount of existing complex software, the entire development process for introducing a new terminal type is both costly and requires a long time thus slowing down the introduction of these new terminals. A problem of the prior art therefore is that the introduction of a new terminal type requires the expenditure of a large amount of development effort and takes an excessively long time because of this required effort.

SOLUTION

The above problem is substantially alleviated and an advance is made over the prior art in accordance with our invention wherein terminals are terminated at a line interface circuit arranged to have hardware and software for interfacing with the connected terminal type and for communicating with the connected telecommunications switch in a standard language such that a particular function, represented by one or more signaling messages or signals, requested by any terminal is coded into a standard representation comprising one or more signaling messages or signals of that function. The coded signal is then passed on to the connected telecommunications switch which identifies the requested function received in the standard language without regard to the terminal type that generated the request. The telecommunications switch also communicates its control signals to the terminal in the same standard language and the line interface arrangement converts the requests presented in the standard language to signals for transmitting that request to the particular terminal type. The term terminal as used herein is very general and includes both simple analog) and complex (ISDN or video) telephone devices, as well as other types of customer premises equipment such as FAX terminals or telemetering equipment; it includes, for example a TV set-top box. The standard language uses signaling messages or signals that include data messages as well as signals representing a supervisory state or for turning on a lamp in a terminal.

In accordance with one aspect of the invention, interfaces for a plurality of terminals are mounted in one unit having a program controlled processor. The processor contains memory for storing tables translating between the standard language and the signaling messages or signals generated or received by the terminal type attached to a particular line interface. In an alternative embodiment, the signaling messages or signals are translated by an integrated circuit chip associated with the interface to the terminal. Optionally, this integrated circuit can have RAM memory and be controlled by a processor, so that the translation can be updated as new features are added to a connected terminal.

In accordance with another aspect of the invention, the signaling messages or signals generated by the line interface unit are transmitted to the telecommunications switch over a facility using a Bellcore standard digital transmission protocol TR303, the same protocol that is used for transmitting signals between subscriber loop carrier remote terminals and a subscriber loop carrier telecommunications switch interface. Advantageously, this permits a standard transmission interface to be used for carrying the common language signaling messages or signals.

DETAILED DESCRIPTION

Figure 1:
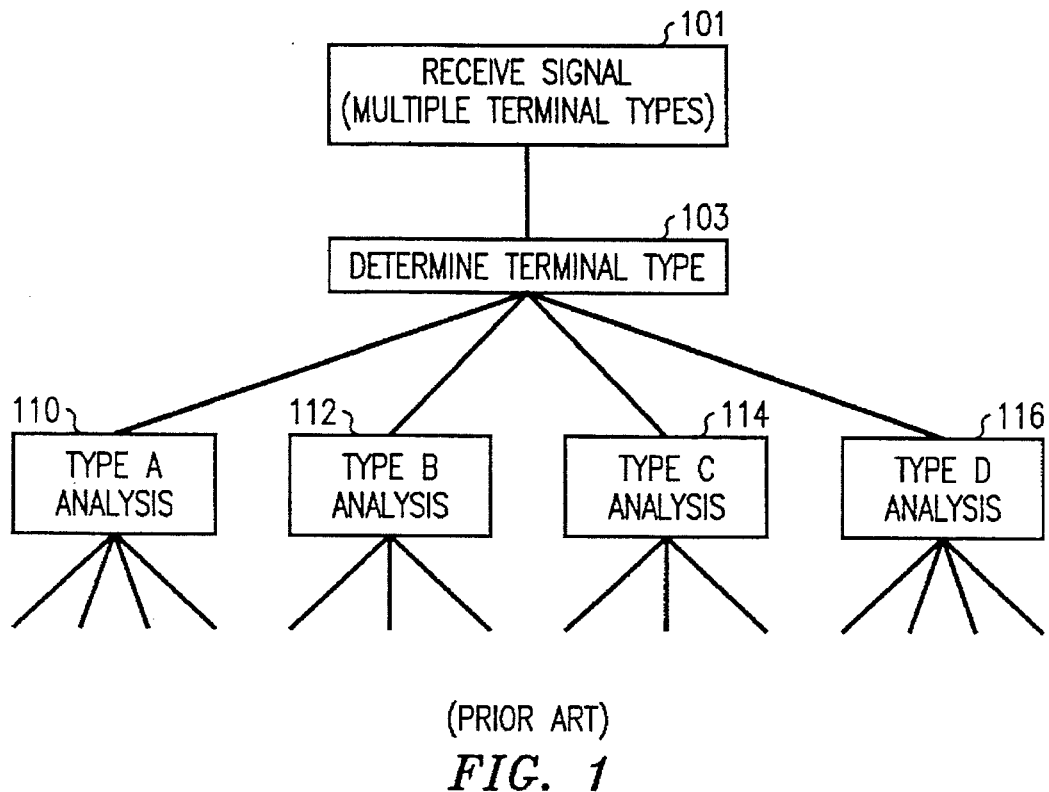
FIG. 1 is a flow diagram of the prior art method of processing signals from a plurality of different types of terminals.

FIG. 1 represents the prior art software structure for receiving signals from the multiple terminal types in a telecommunications switch. The signal is received (action block 101) and the terminal type from which the signal has been received is determined (action block 103). In many cases this determination is made initially by a line translation program and tables when an origination is detected; the type of terminal is then stored in a call processing block for serving a telecommunications call. Thereafter, for each type of terminal an analysis of the received signal is made (action blocks 110, 112, 114, and 116) representing the analysis for terminal type A, B, C, and D, respectively. This analysis then leads in one of the action blocks 110, 112, 114, 116 to one of a number of branches determined by the characteristics of the received signal.

Figure 2:
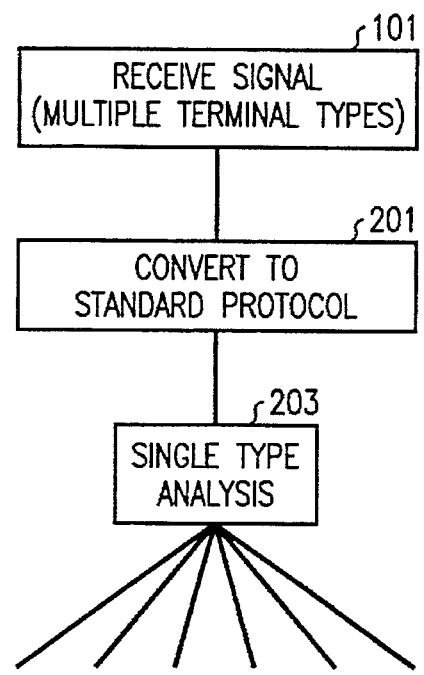
FIG. 2 is a flow diagram illustrating the method in accordance with applicants' invention.

In contrast, FIG. 2 represents the arrangement of this invention. The process is started in the same block 101 which is the opening block of the prior art system of FIG. 1, namely, block 101 which represents the reception of the signal from any of a multiplicity of a plurality of terminal types. However, this signal is converted, in accordance with the principles of the invention, into a standard language signal (action block 201) for transmission to a local switching system (local switch). This is followed by block 203 labeled Unitype analysis in which the convened signal is analyzed without regard to the type of terminal that generated the signal. Following block 203, any one of a plurality of function actions may be performed depending upon the received signal, but independent of the type of terminal.

Figure 3:
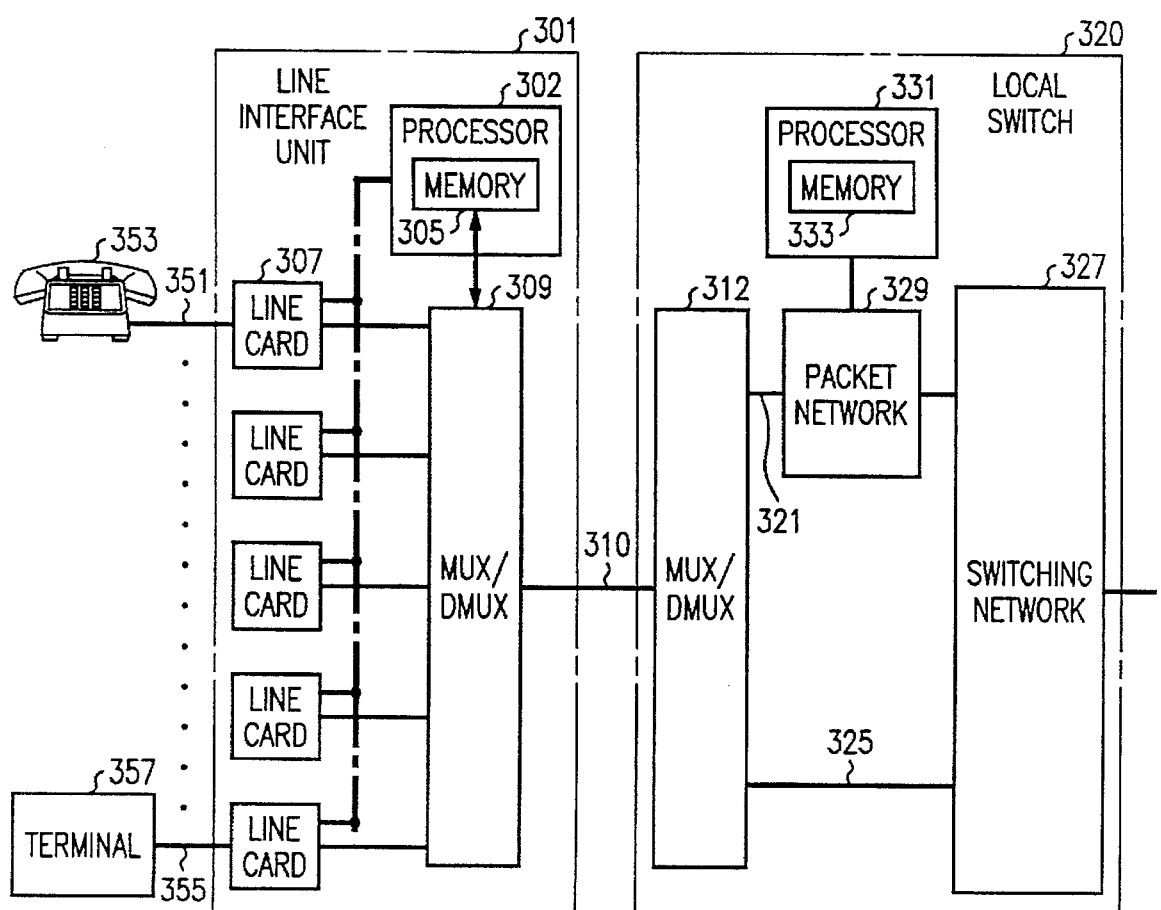
FIG. 3 is a block diagram of apparatus for implementing applicants' invention.

FIG. 3 is an overall system diagram illustrating applicants' invention. Block 301 is a line interface unit having a control processor 302. The control processor includes memory 305 which has tables for translating between function identifiers in the terminal signals and the corresponding function identifiers in the standard language. The lines are terminated on individual line cards 307, or in alternate configurations, may be served in groups on a single card. The line interface unit 301 then multiplexes (MUX/DEMUX 309) communication signals and signaling messages, in the standard language, to transmission 310 for transmission to local switch 320. In one preferred embodiment, multiplexed line 310 carries signals in the protocol of the Bellcore standard TR303. These signals enter the switch 320 via MUX/DEMUX 312, which transmits communication 325 signals to switching network 327, and transmits signaling messages over path 321 to packet network 329. Packet network 329 is connected to a processor 331 containing a memory 333. Processor 331 performs call processing for calls to and from the terminals connected to line unit 301 based on signals received from and using signals transmitted to that line unit. In accordance with the principles of applicants' invention, the signaling messages received at and transmitted from processor 305 are in the standard language.

Figures 4, 5:
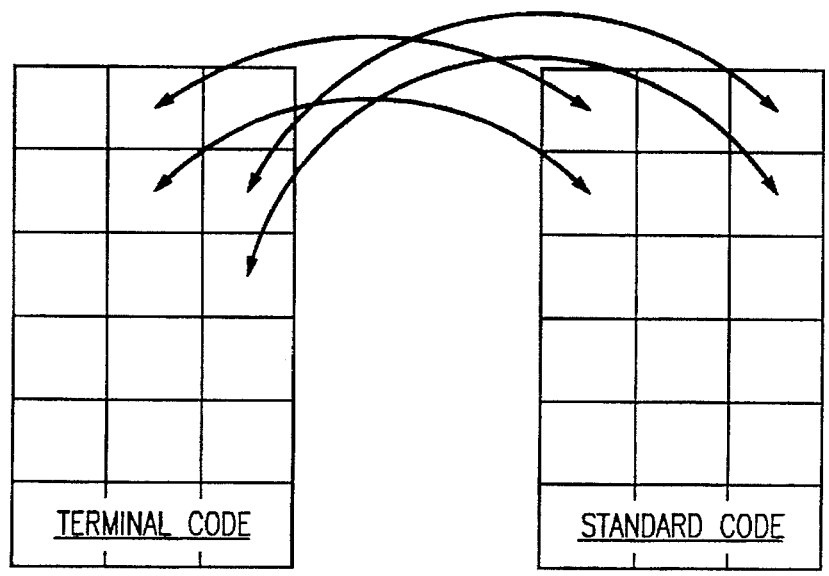
FIGS. 4 and 5 are diagrams of state tables and transitions to illustrate the state changes necessary for implementing applicants' invention.

FIGS. 4 and 5 illustrate the code conversion which takes place in line unit 301. The left maps are state maps for a particular terminal illustrating which data messages from that terminal are encoded into which pair of hexadecimal characters. For example, the pair of hexadecimal characters 1, 4 represents the message that call forwarding is to be turned on for this call. The corresponding message in the standard code is represented by the pair of hexidecimal characters 1, 8. The process of code conversion is illustrated in FIG. 5 which indicates the code conversion changes which must be performed to translate between messages in the terminal code and in the standard code.

The standard code contains many more types of messages than the codes for individual terminals since the standard code must be capable of accepting any set of messages by any of the terminals that it might serve. Effectively, the standard code is a super set of the set of message codes of the individual terminals.

Simple analog telephones are also served by this arrangement. The line interface cards for such telephones converts the supervisory signals, dual tone multifrequency (DTMF), signals, flash signals and any other specialized key signals which may be transmitted to the central office into messages for conversion into standard message set and must also accept messages from the connected local switch requesting that the connected telephone station be alerted (i.e. that ringing be applied).

Note that while a particular example simply shows one lamp going to the on state or the off state, in practice a substantial number of lamp control messages would be provided in the standard encoding.

In order to create maximum flexibility for different types of messages used with different types of terminals the message set is encoded as a two byte function string and a two byte parameter string for those functions which require a parameter. An example of a parameter is the number of a lamp to be turned on or off or the identification of which DTMF signal was keyed by a caller. Where no parameters are needed for a particular kind of message for example a disconnect signal the parameter bytes can be used effectively to increase the number of functions available in the messages.

In one preferred embodiment the message set for analog telephones does not require code conversion because of the large number of analog telephones in use and because of the flexibility of the device which converts between signals from and to the analog telephone station and the data messages from and to the local switch. A processing advantage and consequently also a cost advantage is obtained by avoiding the code conversion step for these telephone stations.

In one preferred embodiment, the standardized language, including all message sets required to implement the functions of supportable terminals, is a language specified by the switch manufacturer. The ISDN Q.931 message set is a candidate base for such a standardized language.

Note that some terminals generate messages that include several signals, such as a complete telephone number, in contrast to other terminals which generate one number at a time. Thus the standard language has the ability to convert several messages into one and vice versa.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. Apparatus for processing calls for a plurality of types of telecommunication terminals, comprising:

line interface means for converting coded control signals for a plurality of terminals on a time shared basis from and to ones of any of said plurality of types of telecommunication terminals to and from a standard set of coded control signals, respectively;

a local switching system comprising processor means for processing coded control signals of said standard set of coded signals for communicating with said line interface means for any of said plurality of types of telecommunication terminals, independent of the type of said any of said plurality of type of telecommunications terminals; and transmission means for connecting said line interface means to said local switching system.

2. The apparatus of claim 1 wherein said transmission means uses the same protocol as used for subscriber loop carrier systems.

3. The apparatus of claim 1 wherein said interface means comprises a processor for specifying conversion of said coded control signals.

4. The apparatus of claim 3 wherein said processor comprises memory tables for specifying data for specifying said converting.

5. The apparatus of claim 1 wherein said interface means comprises circuitry for automatically converting coded control signals for ones of said telecommunication terminals.

6. The apparatus of claim 1 wherein said interface means comprises circuit packs for converting coded control signals for a group of similar terminals.

7. A method for signaling messages for a plurality of types of telecommunications terminals, comprising:

converting coded control signals from and to one of any of said plurality of types of telecommunication terminals to and from a standard set of coded control signals, respectively, said step of converting being performed in line interface means for converting coded control signals for a plurality of terminals on a time shared basis;

transmitting said standard set of coded control signals to or from a switching system serving said plurality of types of telecommunication terminals from or to said line interface means for any of said plurality of types of telecommunication terminals, independent of the type of said any of said plurality of types of telecommunications terminals; and processing only coded control signals from said standard set in said switching system.

* * * * *